UNITED STATES PATENT OFFICE.

CHARLES ROBERT SCHUPPHAUS, OF ZYLONITE, MASSACHUSETTS, ASSIGNOR TO THE AMERICAN ZYLONITE COMPANY, OF NEW YORK, N. Y.

PYROXYLINE VARNISH.

SPECIFICATION forming part of Letters Patent No. 410,205, dated September 3, 1889.

Application filed December 20, 1888. Serial No. 294,155. (Specimens.)

*To all whom it may concern:*

Be it known that I, CHARLES ROBERT SCHUPPHAUS, a subject of the Emperor of Germany, residing at Zylonite, in the county of Berkshire and State of Massachusetts, have invented new and useful Improvements in Solvents of Pyroxyline, of which the following is a specification.

In the manufacture of plastic compounds whose base is soluble pyroxyline, the solvent first used was commercial ethylic ether to form what is known as "collodion." This commercial ethylic ether in 1848 always contained alcohol, and ethylic ether with ethylic alcohol is a perfect solvent of dinitro-cellulose; but the cost of this solvent, owing to the tax on alcohol, limits its employment. Wood-naphtha or methylic alcohol is a very perfect solvent of dinitro-cellulose; but the solvent preferred by most manufacturers is composed of camphor and alcohol, equal parts. The camphor being a solid and having high melting and boiling points, it is necessary to use some liquid to dissolve the camphor. The solution is usually either methylic or ethylic alcohol, or a mixture of them. These liquid solvents evaporate largely from the mass during manipulation of the rolls and the steam heat of the presses, and by subsequent curing and molding the production of the plastic compound is considerably enhanced in cost incident to the loss of weight from these causes. Notwithstanding the fact that a large number of other solvents have heretofore been proposed, few, if any, have been found to give perfectly satisfactory results, and consequently ethylic and methylic alcohols continue to be used. Such being the state of the art, I commenced a series of investigations with a view to determine what solvents would serve as a substitute in whole or in part for the alcohols mentioned, whether the same be used alone or in combination with camphor or other solvents. The result of my investigations has been that I have found, among other materials, that anthraquinone, which is a yellow crystalline compound having a melting-point of 523° Fahrenheit, is a solvent of pyroxyline in conjunction with alcohol. It may be used in all cases where its color is no impediment. The use of this is compatible with the well-known solvents used commercially at the present time in the conversion of pyroxyline.

It will be understood that the proportions of the ingredients to be used are determined by the nature of the ultimate product desired—*i. e.,* whether a collodion or liquid varnish is to be prepared or a solid plastic body or mass which may be molded or worked into various forms. For pyroxyline varnishes a larger quantity of liquid solvent or solvents will be used, while a less proportion will be required for the production of a plastic body or mass.

What I claim is—

In the manufacture of pyroxyline compounds, a varnish or plastic compound consisting of nitro-cellulose in combination with anthraquinone and alcohol, substantially as described.

In testimony whereof I affix my signature in presence of two witnesses.

CHARLES ROBERT SCHUPPHAUS.

Witnesses:
H. SCHOMBURG,
H. H. SCHÜRMANN.